United States Patent
Choi et al.

(10) Patent No.: US 9,452,758 B2
(45) Date of Patent: Sep. 27, 2016

(54) METHOD, SYSTEM, AND COMPUTER READABLE MEDIUM FOR DISPLAYING DRIVER'S PROPENSITY

(71) Applicants: Hyundai Motor Company, Seoul (KR); Kia Motors Corporation, Seoul (KR)

(72) Inventors: Yong Kak Choi, Seoul (KR); Han Gil Park, Gyeonggi-Do (KR); Hoon Han, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/569,667

(22) Filed: Dec. 13, 2014

(65) Prior Publication Data

US 2015/0336586 A1    Nov. 26, 2015

(30) Foreign Application Priority Data

May 22, 2014 (KR) .......... 10-2014-0061462

(51) Int. Cl.
| | |
|---|---|
| *B60Q 1/00* | (2006.01) |
| *B60W 40/09* | (2012.01) |
| *B60K 35/00* | (2006.01) |
| *B60R 16/023* | (2006.01) |
| *B60W 50/00* | (2006.01) |
| *B60W 50/14* | (2012.01) |
| *G07C 5/08* | (2006.01) |

(52) U.S. Cl.
CPC .............. *B60W 40/09* (2013.01); *B60K 35/00* (2013.01); *B60R 16/0236* (2013.01); *B60K 2350/1092* (2013.01); *B60W 2050/0089* (2013.01); *B60W 2050/146* (2013.01); *G07C 5/0808* (2013.01); *G07C 5/0816* (2013.01)

(58) Field of Classification Search
CPC .............................. B60K 35/00; B60W 40/09
See application file for complete search history.

(56) References Cited

U.S. PATENT DOCUMENTS

| | | | | |
|---|---|---|---|---|
| 2002/0109605 | A1* | 8/2002 | Liu ......................... | G08B 5/36 340/815.65 |
| 2011/0037582 | A1 | 2/2011 | Wu | |
| 2013/0173128 | A1* | 7/2013 | Syed ....................... | B60R 16/02 701/70 |
| 2014/0077941 | A1* | 3/2014 | Yamamura ............ | B60W 20/00 340/438 |

FOREIGN PATENT DOCUMENTS

| | | |
|---|---|---|
| JP | 2010-038647 A | 2/2010 |
| JP | 2012-066621 A | 4/2012 |
| JP | 05-176402 B2 | 4/2013 |
| KR | 10-0900379 | 5/2009 |
| KR | 1020090065998 A | 6/2009 |
| KR | 10-2010-0019006 | 2/2010 |
| KR | 10-2010-0035959 A | 4/2010 |
| KR | 10-2010-0110102 A | 10/2010 |
| KR | 10-2011-0062701 | 6/2011 |
| WO | 2011/030398 A1 | 3/2011 |

\* cited by examiner

*Primary Examiner* — Omeed Alizada
(74) *Attorney, Agent, or Firm* — Mintz Levin Cohn Ferris Glovsky and Popeo, P.C.; Peter F. Corless

(57) ABSTRACT

A method of displaying a driver's propensity includes: determining a current drive mode, at a plurality of predetermined times, of a vehicle that is in operation, each determined current drive mode being selected from a plurality of predetermined drive modes; calculating cumulative ratios of each determined current drive mode by accumulating in real-time ratios of the current drive mode determined at each of the plurality of predetermined times; and simultaneously displaying the cumulative ratios of each determined current drive mode and the predetermined drive modes to inform the driver of the cumulative ratios.

15 Claims, 5 Drawing Sheets

METHOD, SYSTEM, AND COMPUTER READABLE MEDIUM FOR DISPLAYING DRIVER'S PROPENSITY

CROSS-REFERENCE TO RELATED APPLICATION

This application claims under 35 U.S.C. §119(a) the benefit of and priority to Korean Patent Application No. 10-2014-0061462 filed on May 22, 2014, the entire contents of which are incorporated herein by reference.

BACKGROUND (a) Technical Field

The present disclosure relates to a method, system, and computer readable medium for displaying a driver's propensity. More particularly, it relates to a method, system, and computer readable medium for displaying a driver's propensity which promotes eco-driving by displaying drive modes of a vehicle according to the driver's propensity so that the driver can recognize it.

(b) Background Art

In general, the fuel efficiency and power performance of vehicles may depend on driving environments and driving situations of drivers. The driving environments (i.e., external factors) refer to situations that are natural and affected by environmental factors, such as temperature, wind, humidity, inclination, and the like. The driving situations of drivers (e.g., internal factors) refer to the differences of drivers (e.g., due to driving propensity of drivers). For example, the driving situations of drivers are changed by a difference in propensity of a radical driver and a normal (i.e., non-radical) driver, and accordingly, the performance of the vehicles is affected.

Accordingly, various driving modes have been developed so that drivers can select to improve their differences. That is, drivers can select drive modes of their own record, and thus, drive modes suited to their driving style are available. The drive modes may be divided, for example, into a drive mode for the optimum fuel efficiency, such as an ECO mode, a drive mode focused on drivability, such as a normal mode, and a drive mode focused only on power performance and drivability, such as a sports mode.

As such, drivers can select their desired drive modes. However, there is an increasing need to improve influence of driving situations (i.e., differences) of drivers by means of the classification in various drive modes and the perception of drivers. The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to solve the above-described problems associated with related art.

An object of the present disclosure is to provide a method, system, and computer readable medium for displaying a driver's propensity which provides drivers with an opportunity to make eco-driving-friendly decisions for improving fuel efficiency or performance by encouraging them to be able to recognize their driving propensity according to driving situations.

In one aspect, the present disclosure provides a method of displaying driver's propensity, which includes: determining a current drive mode, at a plurality of predetermined times, of a vehicle that is in operation, each determined current drive mode being selected from a plurality of predetermined drive modes; calculating cumulative ratios of each determined current drive mode by accumulating in real-time ratios of the current drive mode determined at each of the plurality of predetermined times; and simultaneously displaying the cumulative ratios of each determined current drive mode and the predetermined drive modes to inform the driver of the cumulative ratios.

The predetermined drive modes may include at least one of an economy drive mode, a normal drive mode, and a dynamic drive mode, based on the propensity of the driver.

The predetermined drive modes may include at least one of an economy drive mode, a normal drive mode, and a dynamic drive mode, based on the propensity of the driver by highlighting.

In the determining of the current drive mode, the current drive mode may be determined from a drive mode map where a driver propensity index correction value is inputted.

The driver propensity index correction value may be created by correcting a driver propensity index using a fuel efficiency factor.

The drive mode map may be formed by matching the predetermined drive modes to the driver propensity index correction value.

In the determining of the current drive mode, a fuel efficiency factor for correcting a driver propensity index may be determined from a fuel efficiency map where a driver propensity level and an average fuel efficiency for a predetermined time are inputted.

The fuel efficiency map may be formed by matching the fuel efficiency factor to the driver propensity level and the average fuel efficiency for the predetermined time.

The average fuel efficiency may be calculated using a moving average type and fuel efficiency data created at each of the plurality of predetermined times.

In the determining of the current drive mode, drive mode calculation by a cluster may be limited when an engine of the vehicle is not started, when a system alarm related to starting of the engine is generated, when the temperature of engine coolant is under a predetermined temperature, when the temperature of transmission oil is under a predetermined temperature, or when a vehicle speed is out of a predetermined range.

In the calculating of the cumulative ratios, a cumulative ratio of the predetermined drive modes may be calculated as a percentage.

The cumulative ratios may be stored on a memory of a cluster when an engine of the vehicle is stopped, and data stored on the memory of the cluster and data outputted on a display unit of the cluster may be initialized by forcibly resetting the cluster, in any one of conditions that a total driving distance is greater than a predetermined distance, that an amount of fuel equal to or greater than a predetermined amount is supplied, and that a reset signal is generated by operating a button.

A system and a computer readable medium for executing the above-described techniques are further disclosed herein.

The method, system, and computer readable medium for displaying a driver's propensity according to the present invention has at least the following advantages:

1. It is possible to promote economical driving (i.e., driving with improved fuel efficiency) by allowing a driver to know a so-called 'my drive mode' based on his/her drive propensity.

2. It is possible to perform the techniques described herein without a specific sensor or additional cost, and it is also possible to improve fuel efficiency by preventing an excessive drop of fuel efficiency by relatively radical drivers.

Other aspects and embodiments of the disclosure are discussed infra.

BRIEF DESCRIPTION OF THE DRAWINGS

The above and other features of the present disclosure will now be described in detail with reference to embodiments thereof illustrated by the accompanying drawings which are given hereinbelow by way of illustration only, and thus are not limitative of the present disclosure, wherein.

Figure 1:
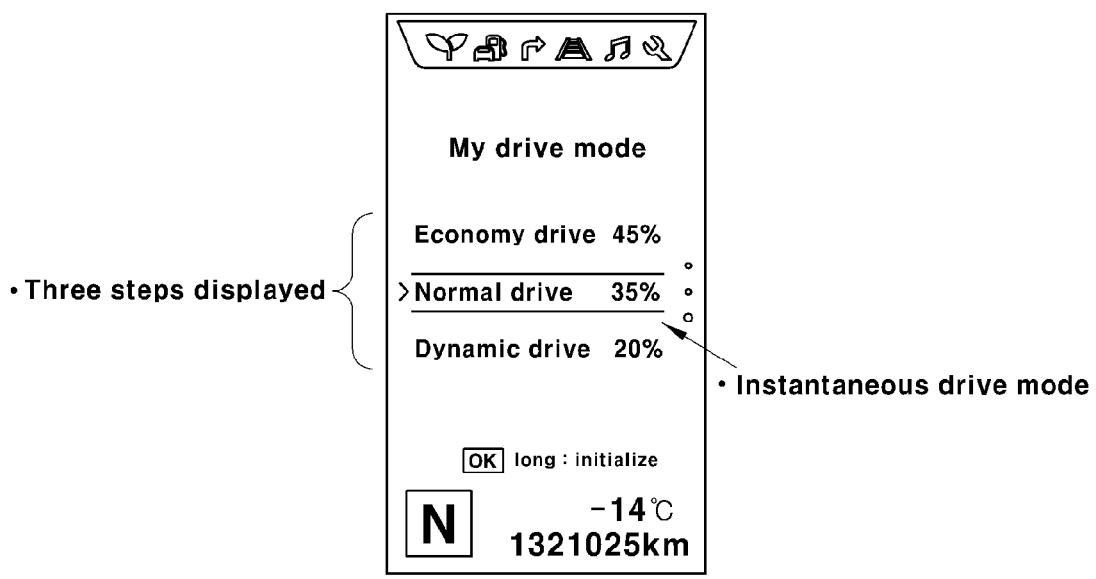
FIG. 1 is a view showing a display unit in a cluster displaying a 'my drive mode' determined by the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter, reference will now be made in detail to various embodiments of the present disclosure, examples of which are illustrated in the accompanying drawings and described below. While the disclosure will be described in conjunction with embodiments, it will be understood that present description is not intended to limit the invention to those embodiments. On the contrary, the disclosure is intended to cover not only the disclosed embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit and/or calculation unit. The term "control unit" or "calculation unit" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit and/or calculation unit, whereby the apparatus is known in the art to be suitable for displaying a driver's propensity.

Furthermore, the control unit and/or calculation unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present disclosure relates to a method for displaying driver's propensity and encourages drivers to drive in an eco-friendly manner by displaying a 'my drive mode' on a display unit in a vehicle, so that the drivers can perceive their own driving propensity. Most control processes for displaying the 'my drive mode' on a display unit of a cluster in a vehicle are performed by a control unit of a cluster, and a calculation process for determining the current drive mode in those processes is performed by a calculation unit of a cluster.

The 'my drive mode' is displayed on a display unit in a vehicle, such as the display unit of a cluster, so as to enable a driver to easily find it, even if he/she is driving, and as shown in FIG. 1, cumulative ratios (i.e., occupation ratios of cumulative calculated time) of the current drive mode of a vehicle (i.e., instantaneous drive mode) and individual drive modes that are set in advance are shown into percentages. The predetermined individual drive modes that are set in advance are classified into three steps of drive modes of economy drive, normal drive, and dynamic drive, and the current drive mode of a vehicle that is determined and updated in real time is separately shown by highlighting to be visually shown to a driver. The individual drive modes may be divided into the three steps of drive mode in consideration of fuel efficiency and performance of a vehicle.

The ratios of the individual drive modes are shown by numerals in FIG. 1, but they may be shown with diagrams (i.e., pictures), etc. That is, the ratios of the individual drive mode of the 'my drive mode' are shown with numerals or diagrams so that a driver who is driving can visually discriminate the drive modes, and they may be simultaneously shown so that a driver can recognize at a look the cumulative time occupation ratios of the predetermined drive modes. The 'my drive mode' shows the total of the cumulative ratios of the predetermined individual drive modes (i.e., economy drive+normal drive+dynamic drive) as 100%. The current drive mode displayed on a display unit is the current driving state of the vehicle which is updated at each of a plurality of predetermined times (e.g., several seconds) and determined in real-time.

Figure 2:
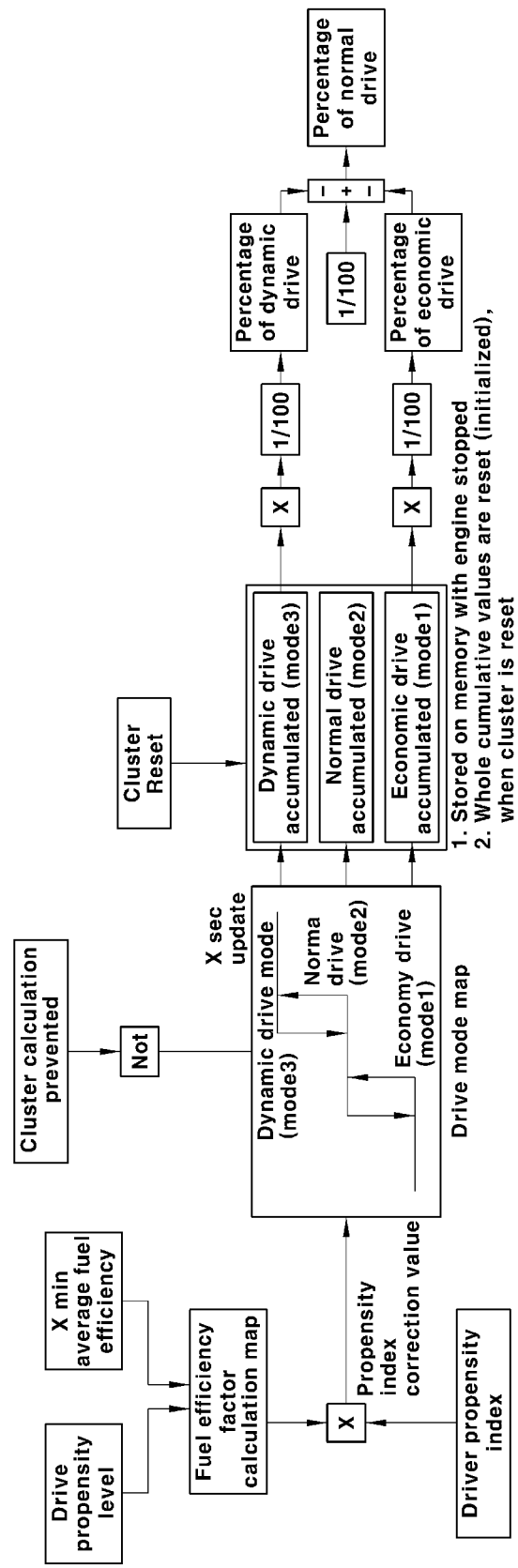
FIG. 2 is a view showing a calculation process for explaining a method of displaying driver's propensity according to the present disclosure.
Figure 3:
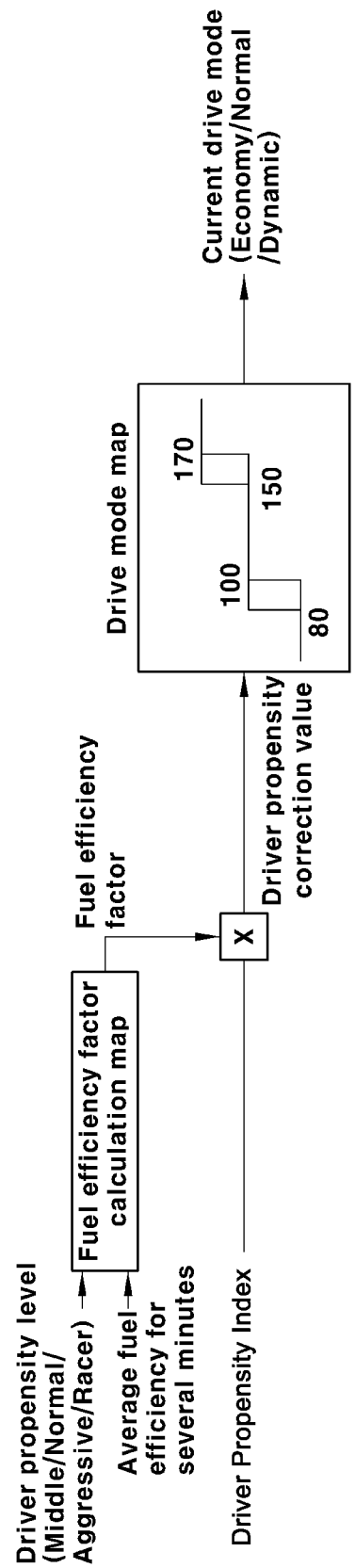
FIG. 3 is a view showing a calculation process of determining the current drive mode in the 'my drive mode' determined by the present disclosure.

FIG. 2 is a view showing a calculation process for explaining a method of displaying driver's propensity according to the present disclosure, and FIG. 3 is a view showing a calculation process of determining the current drive mode of a vehicle by the present disclosure.

Referring to FIGS. 2 and 3, a driver propensity index and a driver propensity level that are inputted in real-time are used to determine the current drive mode from the individual drive modes that are set in advance (i.e., predetermined). The driver propensity index is set in advance by numerically processing operations by a driver and behavior states of a vehicle in consideration of an APS (Accel Position Sensor), a BPS (Brake Position Sensor), On/Off of an engine, and costing, and the driver propensity level is determined on the basis of the driver propensity index.

The driver propensity level is classified into four steps of propensity levels, that is, mild, normal, aggressive, and racer levels. Accordingly, the propensity of a driver who is driving a vehicle can be determined by one of the four steps of levels in consideration of operations of the driver and behaviors of the vehicle, in which the current drive mode to be displayed on the display unit is determined on the basis of the driver propensity level and the driver propensity index determined in real-time.

In the four steps of levels, the mild level may be displayed as the economy drive mode, the normal level may be displayed as the normal drive mode, and the aggressive and racer levels may be displayed as the dynamic drive mode in accordance with the driver's propensity. But the current drive mode according to the driver's propensity is more accurately determined on the basis of a fuel efficiency factor in the present disclosure. A technology of determining the driver propensity index and propensity level in real-time has been proposed in Korean Patent Application No. 2013-015667 (Dec. 16, 2013) by the applicant(s), so the detailed description is not provided herein.

As shown in FIGS. 2 and 3, the current drive mode that is determined in real-time is determined on the basis of the driver propensity index, the driver propensity level, and the fuel efficiency factor, and the determined current drive mode is transmitted to and displayed on the display unit (e.g., a display unit of a cluster). That is, a current drive mode determined in accordance with a resultant value corrected on the basis of the fuel efficiency factor (i.e., a value obtained by correcting the driver propensity index) is displayed on the display unit The process of determining the current drive mode may be composed of a process of calculating a fuel efficiency factor, a process of calculating a driver propensity index correction value using the calculated fuel efficiency factor, and a process of determining the current drive mode using the driver propensity index correction value. The fuel efficiency factor is calculated from a fuel efficiency map set in advance and stored in a calculation unit of the cluster (or a control unit of the cluster). The fuel efficiency map is formed by matching fuel factors to the driver propensity level and an average fuel efficiency for several minutes, and accordingly, when the driver propensity level and the average fuel efficiency are inputted, corresponding fuel efficiency factors are provided as outputs. That is, when the driver propensity level and the average fuel efficiency that are inputted in real time are used as inputs on the fuel efficiency map, fuel efficiency factors can be obtained as resultant values outputted from the fuel efficiency map.

Figure 4:
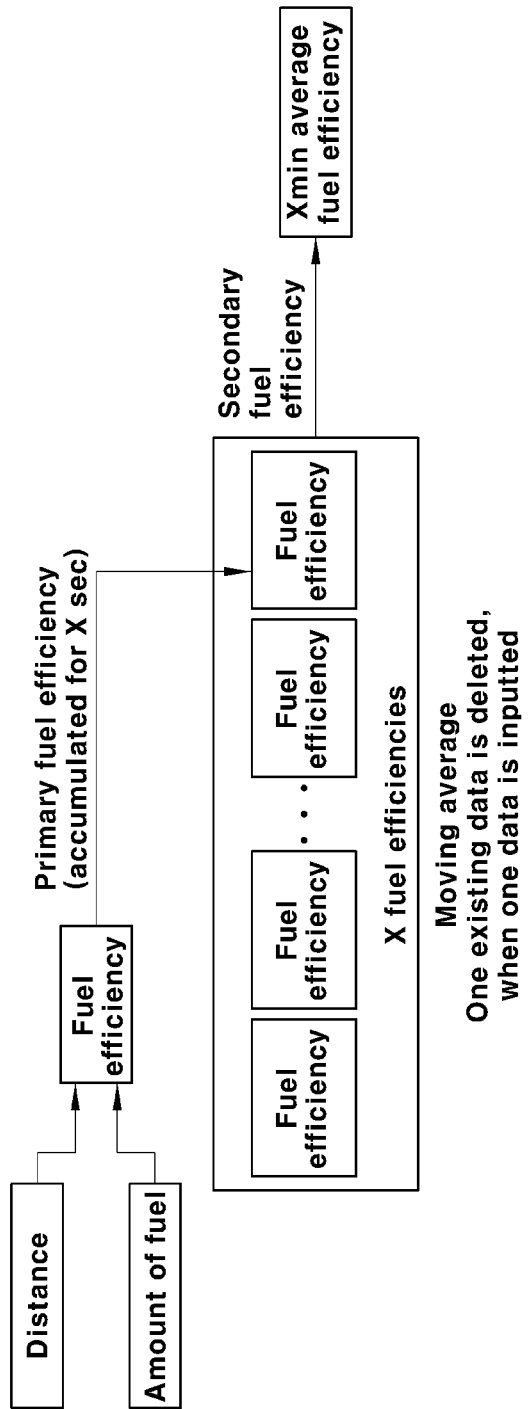
FIG. 4 is a view showing a calculation process of average fuel efficiency used in determination of the current drive mode in the 'my drive mode' determined by the present disclosure.

The average fuel efficiency is an average fuel efficiency obtained by averaging the fuel efficiencies for several minutes, and as shown in FIG. 4, it is determined as the average value of vehicle fuel efficiency data calculated on the basis of a running distance and the amount of fuel consumption at every several seconds. That is, the average fuel efficiency is calculated in a moving average type (e.g., calculating an average value with one new data additionally inputted and the one oldest data deleted), using fuel efficiency data created at each of the plurality of predetermined times.

Further, the driver propensity index correction value is acquired on the basis of the obtained fuel efficiency factor and a driver propensity index inputted in real-time. In detail, the driver propensity index correction value is calculated as the multiple of the fuel efficiency factor and the driver propensity index. Next, the current drive mode is determined on the basis of the calculated driver propensity index correction value, in which the current drive mode is determined from a drive mode map set in advance and stored in the calculation unit of the cluster (or the control unit of the cluster).

The drive mode map is formed by matching the individual drive modes to the driver propensity index correction value, and accordingly, when a driver propensity index correction value is inputted, a corresponding individual drive mode is provided. That is, when the driver propensity index correction value calculated in real-time is used as an input on the drive mode map, the current drive mode can be acquired as a resultant value outputted from the drive mode map. In other words, when a driver propensity index correction value is inputted, the drive mode map outputs a matched drive mode in the individual drive modes as the current drive mode.

The current drive mode determined from the drive mode map is transmitted to and displayed in real-time on the display unit (e.g., a display unit of the cluster), and the calculation unit of the cluster accumulates the ratios (i.e., time occupation ratios) of the current drive modes determined in real time at each of the plurality predetermined times, calculates it into a percentage, and then transmits it to the display unit to be displayed. In other words, the current display mode is determined in real-time at every predetermined time, and simultaneously, the calculation unit of the cluster accumulates and calculates the time occupation ratio of the drive mode, which corresponds to the current drive mode in the predetermined drive modes, into a percentage, and the calculated percentage data is transmitted to and displayed on the display unit. Accordingly, a current drive mode with the drive propensity corrected on the basis of the fuel efficiency, and the cumulative ratios of the individual drive modes are both shown in the 'my drive mode' displayed on the display unit.

In an example shown in FIG. 2, the economy drive mode and the dynamic drive mode are converted into percentages after the ratios (i.e., time occupation ratios) are cumulatively calculated for a predetermined time, and the percentage of the normal drive mode is calculated by subtracting the percentages of the converted economy drive mode and the dynamic drive mode from 100%. The percentages of the predetermined individual drive modes calculated in this way are automatically stored on a memory of the cluster when the engine of the vehicle is stopped, and the data stored on the memory are all reset and initialized to '0' when the cluster is reset.

Figure 5:
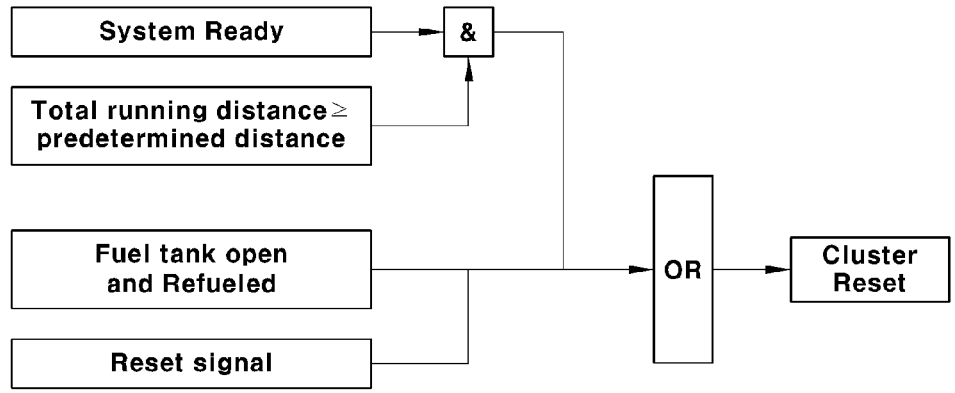
FIG. 5 is a view showing reset conditions for a cluster, when the 'my drive mode' is determined by the present disclosure.

Referring to FIG. 5, when a condition that the total running distance is over a predetermined distance is satisfied while the engine started (i.e., system ready), or when a condition that a predetermined or more amount of fuel is supplied is satisfied while the fuel tank is open, the cluster is reset or the cluster may be forcibly reset under a condition of generating a reset signal by operating a button (e.g., a reset button).

When setting about the 'my drive mode' and the stored data are not reset for a too long period of time, the 'my drive mode' loses the function of data informing a driver of his/her drive propensity. In this case, the learning effect of the driver through real-time update of the 'my drive mode' displayed on the cluster may be reduced by half. Accordingly, when there is a need of initializing the values in the 'my drive mode', a driver forcibly initializes all of the 'my drive mode' displayed on the cluster and the related data stored on the memory of the cluster by operating a reset button, as described above, or resets all of the values in the 'my drive mode' displayed on the cluster and the related data stored on the memory of the cluster, when a cluster reset condition is satisfied by opening the petrol cap and supplying a predetermined or more amount of fuel, or forcibly resets all of the values in the 'my drive mode' displayed on the cluster and the related data stored on the memory of the cluster, when a predetermined condition about the running distance and time is satisfied in long distance running.

Figure 6:
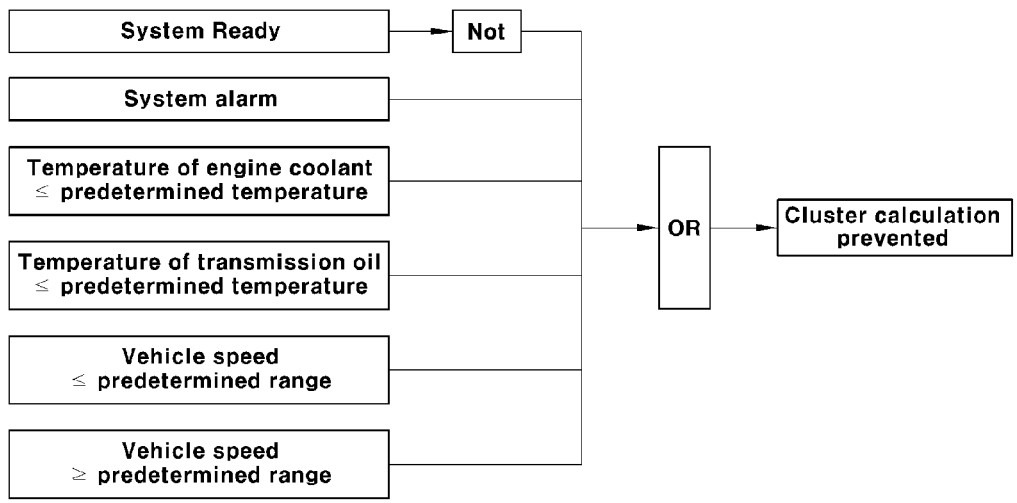
FIG. 6 is a view showing reset conditions for limiting a calculation operation of the cluster, when the 'my drive mode' is determined by the present disclosure.

FIG. 6 is a view showing conditions for limiting a drive mode calculation operation of a cluster. Since the 'my drive mode' promotes economical driving by letting a driver know his/her drive propensity, the 'my drive mode' can prevent reduction in fuel efficiency of a vehicle. Accordingly, it is possible to improve fuel efficiency by stopping calculation of the 'my drive mode' by limiting the operation of calculating the current drive mode by the cluster, under the state and speed conditions of a vehicle shown in FIG. 6.

Referring to FIG. 6, since the calculation unit of the cluster calculates the current drive mode only while an engine started (i.e., system ready), the drive mode calculation of the cluster is prevented, in any one of the cases when the engine is not started, when an alarming lamp that is turned on when the engine is started is turned off or goes on and off (i.e., when a system alarm is generated), when the temperature of the engine coolant is under a predetermined temperature, when the temperature of the transmission oil is under a predetermined temperature, and when the vehicle speed is out of a predetermined range.

As described above, the cluster separately performs the functions of displaying and calculating therein, e.g., the calculation unit of the cluster performs the calculation process of determining the current drive mode and the process of calculating the ratios of the individual drive modes into percentages, and the display unit of the cluster displays the resultant values by the calculation unit to let a drive know them. Further, the calculation unit of the cluster stores data on the memory of the cluster or takes and uses stored data, if needed.

According to the method for displaying driver's propensity according to the present invention, since the 'my drive mode' is displayed in real-time on the basis of the drive propensity of a driver, it is possible to improve fuel efficiency by promoting economical drive. Further, the method for displaying driver's propensity according to the present disclosure can be used for not only hybrid vehicles but electric vehicles, plug-in hybrid vehicles, fuel cell vehicles, common gasoline vehicles, etc.

The invention has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for displaying a driver's propensity, comprising:
   determining a current drive mode, at a plurality of predetermined times, of a vehicle that is in operation, each determined current drive mode being selected from a plurality of predetermined drive modes;
   calculating cumulative ratios of each determined current drive mode by accumulating in real-time ratios of the current drive mode determined at each of the plurality of predetermined times; and
   simultaneously displaying the cumulative ratios of each determined current drive mode and the plurality of predetermined drive modes to inform the driver of the cumulative ratios,
   wherein the current drive mode is displayed in real time on the basis of the drive propensity of a driver.

2. The method of claim 1, wherein the plurality of predetermined drive modes include at least one of an economy drive mode, a normal drive mode, and a dynamic drive mode, based on the propensity of the driver.

3. The method of claim 1, wherein the determined current drive mode is displayed to be discriminated from the predetermined drive modes.

4. The method of claim 3, wherein the determined current drive mode is displayed to be discriminated from the predetermined drive modes by highlighting.

5. The method of claim 1, wherein in the determining of the current drive mode, the current drive mode is determined from a drive mode map where a driver propensity index correction value is inputted.

6. The method of claim 5, wherein the driver propensity index correction value is created by correcting a driver propensity index using a fuel efficiency factor.

7. The method of claim 5, wherein the drive mode map is formed by matching the predetermined drive modes to the driver propensity index correction value.

8. The method of claim 1, wherein in the determining of the current drive mode, a fuel efficiency factor for correcting a driver propensity index is determined from a fuel efficiency map where a driver propensity level and an average fuel efficiency for a predetermined time are inputted.

9. The method of claim 8, wherein the fuel efficiency map is formed by matching the fuel efficiency factor to the driver propensity level and the average fuel efficiency for the predetermined time.

10. The method of claim 8, wherein the average fuel efficiency is calculated using a moving average type and fuel efficiency data created at each of the plurality of predetermined times.

11. The method of claim 1, wherein in the determining of the current drive mode, drive mode calculation by a cluster is limited when an engine of the vehicle is not started, when a system alarm related to starting of the engine is generated, when the temperature of engine coolant is under a predetermined temperature, when the temperature of transmission oil is under a predetermined temperature, or when a vehicle speed is out of a predetermined range.

12. The method of claim 1, wherein in the calculating of the cumulative ratios, a cumulative ratio of the predetermined drive modes is calculated as a percentage.

13. The method of claim 1, wherein the cumulative ratios are stored on a memory of a cluster when an engine of the vehicle is stopped, and data stored on the memory of the cluster and data outputted on a display unit of the cluster are initialized by forcibly resetting the cluster, in any one of conditions that a total driving distance is greater than a predetermined distance, that an amount of fuel equal to or greater than a predetermined amount is supplied, and that a reset signal is generated by operating a button.

14. A system, comprising:
a memory that stores program instructions; and
a processor configured to execute the stored program instructions, which when executed perform a method for displaying a driver's propensity, including:
determining a current drive mode, at a plurality of predetermined times, of a vehicle that is in operation, each determined current drive mode being selected from a plurality of predetermined drive modes;
calculating cumulative ratios of each determined current drive mode by accumulating in real-time ratios of the current drive mode determined at each of the plurality of predetermined times; and
simultaneously displaying the cumulative ratios of the each determined current drive mode and the plurality of predetermined drive modes to inform the driver of the cumulative ratios,
wherein the current drive mode is displayed in real time on the basis of the drive propensity of a driver.

15. A non-transitory computer readable medium containing program instructions for displaying a driver's propensity, the computer readable medium comprising:
program instructions that determine a current drive mode, at a plurality of predetermined times, of a vehicle that is in operation, each determined current drive mode being selected from a plurality of predetermined drive modes;
program instructions that calculate cumulative ratios of each determined current drive mode by accumulating in real-time ratios of the current drive mode determined at each of the plurality of predetermined times; and
program instructions that simultaneously display the cumulative ratios of the each determined current drive mode and the plurality of predetermined drive modes to inform the driver of the cumulative ratios,
wherein the current drive mode is displayed in real time on the basis of the drive propensity of a driver.

* * * * *